T. F. GRIFFITHS.
Churn.
No. 40,404. Patented Oct. 27, 1863.
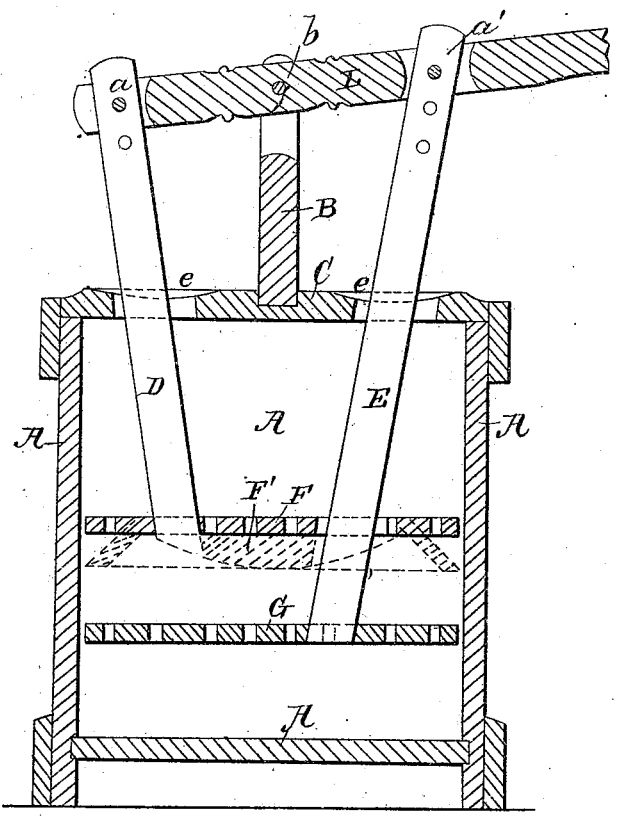
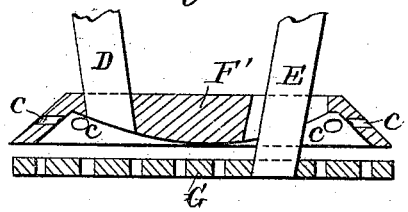

UNITED STATES PATENT OFFICE.

T. F. GRIFFITHS, OF DANSVILLE, NEW YORK.

IMPROVEMENT IN CHURNS.

Specification forming part of Letters Patent No. 40,404, dated October 27, 1863.

*To all whom it may concern:*

Be it known that I, T. F. GRIFFITHS, of Dansville, in the county of Livingston and State of New York, have invented a new and useful Improvement in Churns; and I do hereby declare that the following is a full, clear, and exact description thereof, reference being had to the accompanying drawings, making a part of this specification, in which—

Figure 1 is a vertical section of an ordinary "box-churn" with my invention applied. Fig. 2 is a detached vertical section of the heads F' and G, F' being also shown in Fig. 1 by dotted lines.

This invention relates to that class of churns having double reciprocating dashers; and its nature will be understood by reference to the drawings and specification.

The several letters A in the drawings represent the rectangular case in which the dashers work, F the upper, and G the lower dasher-head, and L the lever for working the dashers. This lever is pivoted to the standard B by the bolt b, and is coupled to the dasher-rods D and E by the pins a and a'. The working-space between the dasher-heads F and G may be increased by changing the pin a to the lower hole in the rod D, or it may be increased by placing the pin a' through the lower hole of the rod E. The dasher-head F is hung directly over the dasher G, the rod E of the latter passing through a mortise made in the upper head for that purpose. These heads are pierced with several rows of holes of suitable size, through which the cream is forced. There is an ordinary concave recess, e, in the upper face of the lid C, surrounding each opening, through which the dasher-rods pass.

It will be seen that by the action of the dashers in this churn the cream is subjected to a pressure as well as an agitation.

As the heads F and G approach each other the cream between them is pressed through the orifices of the heads with much greater force than the same is acted upon when a single dasher is used, or two dashers in separate compartments; and as they recede from each other the tendency to form a vacuum between the heads F and G, and, the space between them increasing twice as fast as that below the lower head decreases, the cream pressed through the upper head before is now forced to return below it, and the jets passing through the two heads meet each other and produce an extra agitation, all of which help to break up the globules, and thereby facilitate the process of churning. If desirable, the upper head may be made as seen at F', Fig. 2, which will produce a greater pressure of the cream at the downward stroke than when made as shown at F, because in the former the cream is forced by the conical tight center to escape through a single row of holes, c, which discharge at right angles, or nearly so, with the movement of the dashers, (and therefore does not escape as freely,) and as the head ascends the cream readily passes down its beveled edges and returns to the space between the heads. This construction of the upper head would probably be preferable to the head F.

What I claim as my invention, and desire to secure by Letters Patent, is—

The combination of the head F', constructed as shown and described, with the head G, and operating as and for the purposes set forth.

T. F. GRIFFITHS.

Witnesses:
ORVILLE TOUSEY,
GEO. A. SANDERS.